(12) United States Patent
Shverdin et al.

(10) Patent No.: US 11,456,086 B1
(45) Date of Patent: Sep. 27, 2022

(54) HIGH-BANDWIDTH ATOM-INTERFEROMETRIC GRAVIMETRY AND ACCELEROMETRY

(71) Applicant: AOSense, Inc., Sunnyvale, CA (US)

(72) Inventors: Miroslav Y. Shverdin, Mountain View, CA (US); Matthew Todd Cashen, Gilroy, CA (US); Micah P. Ledbetter, Sunnyvale, CA (US); Martin M. Boyd, Sunnyvale, CA (US); Michael R. Matthews, Palo Alto, CA (US); Alexander F. Sugarbaker, Atherton, CA (US); Adam T. Black, Annandale, VA (US); Akash Rakholia, Sunnyvale, CA (US); Igor Teper, Half Moon Bay, CA (US)

(73) Assignee: AOSense, Inc., Fremont, CA (US)

( * ) Notice: Subject to any disclaimer, the term of this patent is extended or adjusted under 35 U.S.C. 154(b) by 79 days.

(21) Appl. No.: 17/026,810

(22) Filed: Sep. 21, 2020

(51) Int. Cl.
   *G21K 1/00* (2006.01)
   *G01P 15/093* (2006.01)
   *G01V 7/04* (2006.01)

(52) U.S. Cl.
   CPC ............ *G21K 1/006* (2013.01); *G01P 15/093* (2013.01); *G01V 7/04* (2013.01)

(58) Field of Classification Search
   CPC ....... G21K 1/006; G01P 15/093; G01P 15/08; G01V 7/04; G01V 7/00; G01C 19/58
   See application file for complete search history.

(56) References Cited

U.S. PATENT DOCUMENTS

| | | | |
|---|---|---|---|
| 11,175,139 B2* | 11/2021 | Barrett | G01P 15/08 |
| 11,239,617 B2* | 2/2022 | Henry | H01R 13/502 |
| 2019/0376790 A1* | 12/2019 | Barrett | G01P 15/08 |
| 2021/0389127 A1* | 12/2021 | Barrett | G01C 19/58 |
| 2022/0021290 A1* | 1/2022 | Mills | H02K 44/10 |

* cited by examiner

*Primary Examiner* — Wyatt A Stoffa
(74) *Attorney, Agent, or Firm* — Van Pelt, Yi & James LLP (57) ABSTRACT

A high bandwidth gravimeter or accelerometer includes laser(s), modulator(s), and an atomic interferometer. The laser(s) and modulator(s) produce four laser frequencies. A first and second pair of laser frequencies are each separated by $w_m$. The first and second pair are offset by $w_{shift}$. A first laser frequency of the first pair and a second laser frequency of the second pair are separated by $w_m+w_{shift}$. A second laser frequency of the first pair and a first laser frequency of the second pair are separated by $w_m-w_{shift}$. The first pair is routed to arrive from a first direction at atoms in an interaction region, and the second pair from a second direction. The first pair are phase stable with respect to the second pair. $w_m$ is adjusted so that $w_m+w_{shift}$ or $w_m-w_{shift}$ corresponds to a Raman resonance for the atomic interferometer.

14 Claims, 8 Drawing Sheets

HIGH-BANDWIDTH ATOM-INTERFEROMETRIC GRAVIMETRY AND ACCELEROMETRY

BACKGROUND OF THE INVENTION

Atom interferometers exploit the wave-like properties of atoms to sensitively measure small differences between different atomic spatial trajectories. Generally, this is done by measuring interference effects that result when a beam of atoms is manipulated such that the atomic wave packets are split into two or more components and subsequently recombined. These wave-like properties of matter allow interference measurements to be exploited at a scale orders of magnitude smaller than for light because the typical de Broglie wavelengths associated with massive particles are very small compared to wavelengths associated with massless photons of visible light. One important application of atomic interferometers is in the construction of gravimeters or accelerometers. Applications of gravimeters or accelerometers include precision inertial sensing for navigation, geodesy, metrology, seismology, petroleum and mineral prospecting, geophysical surveys, and geophysical research. All these applications benefit from a gravimeter or accelerometer design that is highly mobile, high bandwidth, and can operate in conditions of low gravity. A light-pulse atomic interferometer uses optical pulses that interact with ensembles of atoms (e.g., a ball or group of atoms launched from a magneto-optic trap or from an atomic beam). Gravimeters or accelerometers based on light-pulse atom interferometry typically rely on a single mirror that retro-reflects an interferometer light pulse. A retro-reflecting mirror serves as a reference for interferometer light pulse phase. A cold atom cloud (either released or launched) samples the laser pulse phase referenced to the retro-reflecting mirror. When the Doppler shift due to the velocity of the atomic cloud is small with respect to the transition line-width, measurement of the Raman transition is difficult due to the degeneracy of the underlying signal. As a result, unless there is a sufficient delay time period dedicated to letting the atomic cloud drop or accelerate under gravity or simply accelerate, a Doppler shift will not be able separate the degenerate signal components. The maximum repetition rate of the sensor is therefore limited by this time period of letting the atomic cloud drop or accelerate, which results in a low bandwidth device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for high-bandwidth delay-free gravimetry or accelerometry is disclosed. The system comprises one or more lasers, one or more modulators, and an atomic interferometer. The one or more lasers and the one or more modulators are disposed to produce four laser frequencies, where a first pair of laser frequencies are separated by $w_m$, and a second pair of laser frequencies are separated by $w_m$ and where the first pair of laser frequencies and the second pair of laser frequencies are offset by $w_{shift}$. A first laser frequency of the first pair of laser frequencies and a second laser frequency of the second pair of laser frequencies are separated by $w_m + w_{shift}$, where a second laser frequency of the first pair of laser frequencies and a first laser frequency of the second pair of laser frequencies are separated by $w_m - w_{shift}$. An atomic interferometer is disposed such that the first pair of laser frequencies is routed to arrive from a first direction at atoms in an interaction region and the second pair of laser frequencies is routed to arrive from a second direction at the atoms in the interaction region where the first direction and the second direction are substantially opposite each other (e.g., 180 degrees opposite each other to within a degree, a tenth of a degree, a hundredth of a degree, etc.). The first pair of laser frequencies are phase stable with respect to the second pair of laser frequencies where the frequency $w_m$ is adjusted so that $w_m + w_{shift}$ or $w_m - w_{shift}$ corresponds to a Raman resonance for the atomic interferometer. In some embodiments, the first pair of frequencies is not routed to arrive from the second direction while the second pair of frequencies is routed to arrive from the first direction.

In some embodiments, the one or more lasers comprise(s) one laser, and the one or more modulators comprise(s) a waveguide modulator and an acousto-optic modulator. For example, the system for high-bandwidth delay-free gravimetry or accelerometry includes a frequency-stabilized laser which generates a beam that is passed sequentially through a wave guide modulator (WGM) and through an acousto-optic deflector (AOD) in order to generate magneto-optical trap (MOT) and Raman beams. The Raman beam frequencies are adjusted to enable driving Raman transitions without relying on a Doppler shift to velocity-select transitions in either the up or down directions within the interferometer. This enables high bandwidth measurements of the atom cloud because it is not necessary to wait for the atom cloud to acquire enough velocity from falling or accelerating such that the Doppler effect can be used to velocity-select either the up or down transitions. In some embodiments, a measurement sequence comprises atom loading, preparation, Raman interrogation, and detection. In some embodiments, the measurement sequence does not comprise a dropping or accelerating period.

The MOT and Raman beams are optically coupled and multiplexed to simplify the beam routing hardware and geometry before entering an atomic cloud interaction region of the atomic interferometer where a fluorescence signal is detected using a photodiode (PD). Because the two interferometer beams arrive in the atomic cloud interaction region from opposite directions, it is possible to switch between the $k_{up}$ or $k_{down}$ interferometers in subsequent measurements to reject many long-term gravimeter or accelerometer drifts. For example, the $k_{up}$ and $k_{down}$ interferometers have opposite gravity/acceleration sensitivity but the same sensitivity to many noise sources and drift sources, so running them sequentially and subtracting the outputs is a way to subtract out noise and drifts due to temperature or other effects. Here, both interferometer beams drive the atoms where "up" and "down" correspond to the direction of the imparted momentum kick. For example, k is the wavenumber of the laser light $2\pi/\lambda$, where $\lambda$ is the wavelength corresponding to the momentum kick imparted to the atom during the interaction. $k_{up}$ means that the photon absorbs hk momentum from the upward-propagating beam and emits hk momentum into the downward-propagating beam, so the interaction imparts a 2 hk upward momentum to the atoms. Similarly, $k_{down}$ means that the photon absorbs hk momentum from the downward-propagating beam and emits hk momentum into the upward-propagating beam, so the interaction imparts a 2 hk downward momentum to the atoms. The PD signal contains information about the quantum population states of the atoms and is used by a gravimeter or accelerometer computer to compute an estimate of the local gravitational field or acceleration along one or more axes. The high-bandwidth and delay-free gravimeter or accelerometer is enabled by phase-stable laser beam design features of the system. For example, by using a physical racetrack where two interferometer beams travel along a non-common-mode path or by stabilizing the laser beam optical path using a phase-locking technique.

Figure 1:
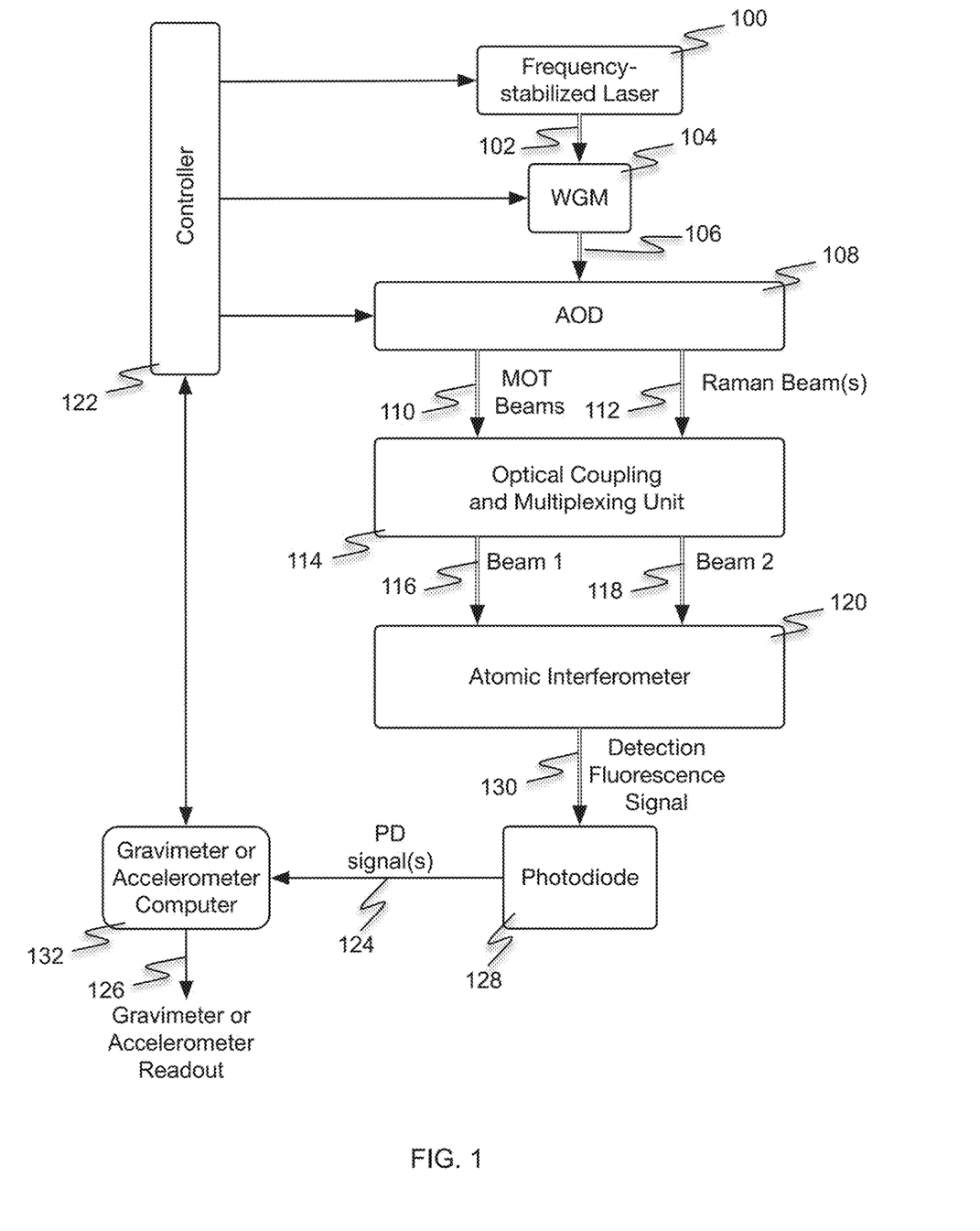
FIG. 1 is a block diagram illustrating an embodiment of an atom interferometer system for high-bandwidth gravimetry or accelerometry.

FIG. 1 is a block diagram illustrating an embodiment of an atom interferometer system for high-bandwidth gravimetry or accelerometry. In the example shown, the interferometer system comprises controller 122, frequency-stabilized laser 100, wave guide modulator (WGM) 104, acousto-optic deflector (AOD) 108, optical coupling and multiplexing unit 114, atomic interferometer 120, photodiode 128, and gravimeter or accelerometer computer 132. Frequency-stabilized laser 100 outputs frequency-stabilized beam 102 for input into WGM 104. For example, frequency-stabilized laser 100 employs a master oscillator power amplifier (MOPA) architecture under the control of controller 122. Seed light for the system derives from an external-cavity diode laser (ECDL) offset-locked from the cooling transition using saturation spectroscopy.

WGM 104 receives beam 102 and outputs beam 106 with a single side-band separated in frequency by $w_m$ for input to AOD 108. For example, broadband WGM 104 outputs beam 106 with a side band by phase modulating beam 102 at an applied frequency of $w_m$. AOD 108 receives beam 106 and outputs magneto-optical trap (MOT) beams 110 for trapping and cooling the atoms in the interferometer and Raman beams 112 for manipulating and measuring the quantum states of the atoms. For example, AOD 108 switches light between MOT beams 110 and Raman beam(s) 112 paths under the control of controller 122 which are subsequently routed though optical coupling and multiplexing unit 114 before entering the atomic interferometer 120. Acousto-optic deflector AOD 108 outputs a pair of Raman beams in Raman beam(s) 112. For example, two Raman beams are created using two frequencies applied to acousto-optic deflector AOD 108 resulting in the generation of two deflection spots comprising two phase-stable Raman beams.

In some embodiments, controller 122 changes the beam properties sequentially for the measurement cycle states: MOT cooling, atomic state preparation, Raman spectroscopy, and fluorescence detection. In some embodiments, micro-electromechanical system (MEMS) switches are used for switching beams. Optical coupling and multiplexing unit 114 receive MOT beams 110 and Raman beam(s) 112 and outputs beam 1 (116) and beam 2 (118) for input into atomic interferometer 120. For example, beam 1 (116) contains the beam for utilizing three MOT beams (one for each dimension) to trap and cool the atoms and beam 2 (118) contains a pair of orthogonally polarized Raman beams that propagate along the same optical path. Atomic interferometer 120 receives beam 1 (116) and beam 2 (118) and outputs detection fluorescence signal 130. For example, within atomic interferometer 120, a racetrack assembly routes a pair of Raman beams such that a user can select and drive Raman transitions without relying on a delay-inducing Doppler shift to velocity select transitions in either the up or down directions. This results in a measurement cycle time that is a sum of only loading time, detection and readout time, and the interferometer interrogation time; there is no wait time for the particles to achieve a velocity by falling (accelerating) before a measurement can be made.

Within atomic interferometer 120, the MOT beams MOT_v1 and MOT_v2 are counter-propagating and have the same circular polarization while the Raman beams have opposite polarizations. Photodiode 128 receives detection fluorescence signal 130 and outputs PD signal(s) 124 for input to gravimeter or accelerometer computer 132. Under the control of controller 122, gravimeter or accelerometer computer 132 outputs gravimeter or accelerometer readout 126 that contains information about the local gravitational field strength and direction.

Figure 2:
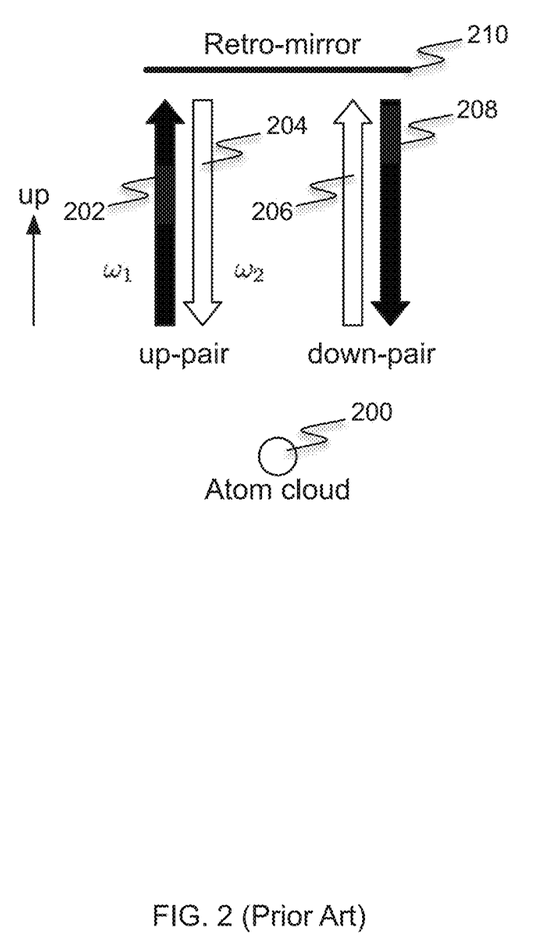
FIG. 2 is a diagram illustrating a prior art embodiment of the traditional set-up of atomic interferometer beams interacting with an atom cloud in a gravimeter or accelerometer.

FIG. 2 is a diagram illustrating a prior art embodiment of the traditional set-up of atomic interferometer beams interacting with an atom cloud in a gravimeter or accelerometer. Gravimeters or accelerometers based on light-pulse atom interferometry (LPAI) typically rely on a single mirror that retro-reflects an interferometer light pulse. A retro-reflecting mirror serves as a reference for interferometer light pulse phase and a cold atom cloud that is either released or launched samples the laser pulse phase referenced to the retro-reflecting mirror.

In the example shown in FIG. 2, first laser beam 202 and its later reflected-version, first laser beam 208, are at frequency $\omega_1$ and second laser beam 206 and its later reflected-version, second laser beam 204, are at frequency $\omega_2$. The frequency difference, is $\omega_1 - \omega_2 = \omega_R \pm \omega_D$, where $\omega_R$ is the two-photon Raman resonance, and $\omega_D$ is the Doppler-shift. The two beams that are retro-reflected from mirror 210 form a pair in the up direction and a pair in the down direction. For atom cloud 200 falling down, the Raman resonance is blue-shifted with respect to the up pair of beams, and red-shifted with respect to the down pair of beams. A user can select which pair of beams will drive the Raman transition. For the up-pair of beams to drive the Raman transition, the user sets $\omega_1 - \omega_2 = \omega_R - \omega_D$. For the down-pair to drive the Raman transition, the user sets $\omega_1 - \omega_2 = \omega_R + \omega_D$.

When the Doppler shift is small with respect to the transition linewidth, both the up and down pair will drive the Raman transition, interfering with each other. This is a major limitation for a retro-reflecting atom gravimeter or accelerometer: the light pulses can simultaneously address both $k_{up}$ and $k_{down}$ transitions unless there is sufficient delay to allow the atom cloud to achieve a falling velocity that causes a Doppler shift. This Doppler shift enables the device to velocity select either the up or down transitions. For typical atomic interferometer gravimeter or accelerometer parameters, this requires a delay of 39 ms or longer after the initial release of the atom cloud, which limits the maximum repetition rate of the sensor resulting in a low bandwidth device.

For example, in a retro Raman configuration, the π-pulse is slightly offset from the top of the atom trajectory. This allows selecting a either a first pair (beam 202, beam 204) or a second pair (beam 206, beam 208) of Raman pulses to be resonant with the Doppler-sensitive transition. In some embodiments, a 10 μs π-pulse has a bandwidth of 100 kHz. However, the atom velocity needs to be $v_0 \geq 3.9$ cm/s for the Doppler-shifted resonance to be offset by the laser linewidth. This requires a time delay of $t_d = v_0/g$, $t_d \geq 39$ ms. Eliminating this time delay would increase the bandwidth of the gravitometer or accelerometer.

Figure 3:
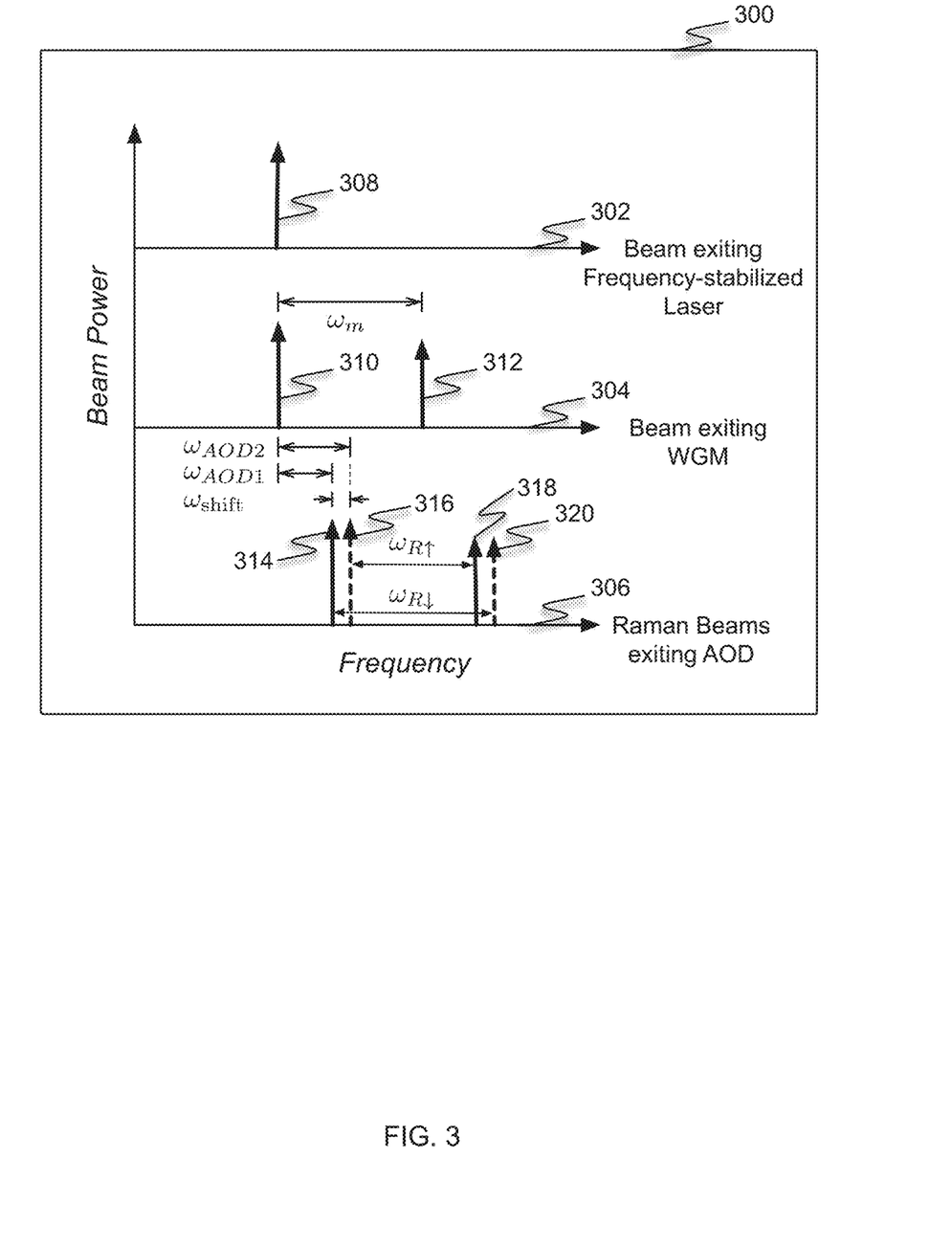
FIG. 3 is a diagram illustrating an embodiment of Raman beam frequency generation that enables driving Raman transitions for high-bandwidth gravimetry or accelerometry.

FIG. 3 is a diagram illustrating an embodiment of Raman beam frequency generation that enables driving Raman transitions for high-bandwidth gravimetry or accelerometry. In 300, laser power spectra are plotted as a function of laser frequency for beams exiting at three sequential stages of optical processing of an atom interferometer system for high-bandwidth gravimetry or accelerometry. In plot 302, the power spectrum for a beam exiting a frequency-stabilized laser is shown. Frequency peak 308 shows a single-frequency power of the beam exiting the frequency-stabilized laser. The single frequency peak corresponds to the optical wavelength of the laser and depends on the particular atom and transition used in the interferometer. For example, for an interferometer that uses Rb-87, the peak is at approximately 384.234 THz. In some embodiments, the frequency-stabilized laser is frequency-stabilized laser 100 of FIG. 1 and exiting beam is beam 102 of FIG. 1.

In plot 304, the power spectrum of a beam exiting a WGM is shown. In some embodiments, the WGM is WGM 104 of FIG. 1 and the beam is beam 106 of FIG. 1. In plot 304, frequency peak 310 is at the same frequency as frequency peak 308 of plot 302 and side-band frequency peak 312 is separated from peak 308 by a frequency of $\omega_m$. The modulation frequency $\omega_m$ is applied via phase modulation and is selected based on the particular atom used by the interferometer. For an interferometer that uses Rb-87, $\omega_m$ is approximately 6.83 GHz.

In plot 306, the power spectrum of Raman beams exiting an acousto-optic deflector (AOD) is shown. In some embodiments, the AOD is AOD 108 of FIG. 1 and the Raman beams are beams 112 of FIG. 1. In plot 306, frequency peak 314 corresponds to unmodulated frequency peak 310 shifted by a frequency $\omega_{AOD1}$, frequency peak 316 corresponds to unmodulated frequency peak 310 shifted by a frequency $\omega_{AOD2}$, frequency peak 318 corresponds to side band frequency peak 312 shifted by a frequency $\omega_{AOD1}$, and frequency peak 320 corresponds to side band frequency peak 312 shifted by a frequency $\omega_{AOD2}$. The difference in frequency between peak 314 and peak 316 and between peak 318 and 320 is given by $\omega_{shift}$. The frequencies $\omega_{AOD1}$ and $\omega_{AOD2}$ are two frequencies applied to an AOD that create two deflection spots that then produce two Raman beams. In some embodiments, the two Raman beams of the interferometer drive Raman resonances via two-photon transitions using counterpropagating beams. For example, the frequency $\omega_{R\_up}$ corresponds to absorbing a photon from the upward-going beam and emitting it into the downward-going beam, and $\omega_{R\_down}$ corresponds to absorbing a photon from the downward-going beam and emitting it into the upward-going beam. The Raman resonance is either driven by the "carrier" of the first Raman beam and the "sideband" of second Raman beam ($\omega_{R\_down}$) or the "carrier" of the second Raman beam and the "sideband" of the first Raman beam ($\omega_{R\_up}$).

Figure 4:
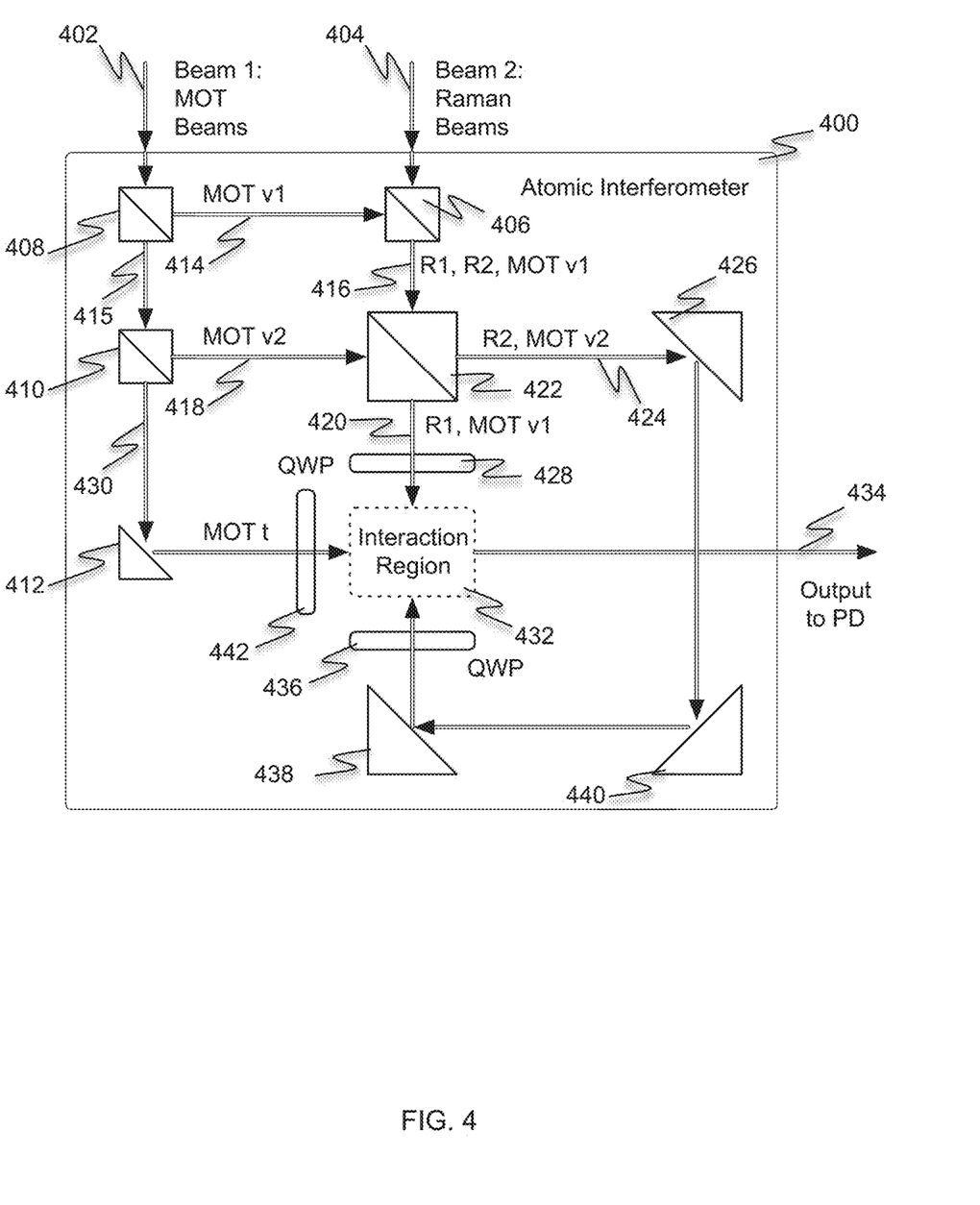
FIG. 4 is a block diagram illustrating an embodiment of an atomic interferometer.

FIG. 4 is a block diagram illustrating an embodiment of an atomic interferometer. In some embodiments, atomic interferometer 400 of FIG. 4 is used to implement atomic interferometer 120 of FIG. 1. In the example shown, the atomic interferometer comprises interaction region 432 polarizing beam-splitter cube (PBS) 422, quarter wave plate (QWP) 428, QWP 442, QWP 436, and optical elements for routing the beams including non-polarizing beam-splitter (NPBS) 406, NPBS 408, NPBS 410, and mirror 412, mirror 426, mirror 438, and mirror 440.

In some embodiments, the first pair of laser frequencies and the second pair of laser frequencies initially follow substantially a same path with opposite linear polarizations, where the first pair of laser frequencies is transmitted through a polarizing beam-splitter before interacting with the atoms from the first direction and the second pair of laser frequencies is deflected by the polarizing beam-splitter and redirected to interact with the atoms from the second direction. For example, beam 2: Raman beams 404 is made up of two orthogonally polarized Raman beams (R1 and R2). For example, R1, the first Raman beam, is linearly polarized and R2, the second Raman beam, is linearly polarized orthogonal to R1. In some embodiments, beam R1 contains frequency peak 316 and frequency peak 320 of FIG. 3 and R2 contains frequency peak 314 and frequency peak 318 of FIG. 3. The two pairs of power peaks $\omega_{R\_down}$ and $\omega_{R\_up}$ shown in FIG. 3 correspond to drawing one frequency from each of the two beams R1 and R2 in FIG. 4. For example, the 2-photon transition $\omega_{R\_down}$ will absorb a photon from peak 320 from (downward-propagating) R1 and reemit a photon from peak 314 into (upward-propagating) R2, while the upward-kicking transition will absorb a photon from peak 318 from (upward-propagating) R2 and reemit a photon from peak 316 into (downward-propagating) R1.

Beam 2: Raman beams 404 pass through NPBS 406 before entering PBS 422. PBS 422 splits R1 and R2. For example, R1 transmits through PBS 422 and R2 reflects 90 degrees by PBS 422. In some embodiments, beam 2: Raman beams 404 comprises a single laser beam whose frequency is changed to make the two orthogonally polarized Raman beams. In some embodiments, beam 2: Raman beams 404 is produced by overlapping two beams with the same polarization, but with different frequencies which are turned on and off to mimic a single beam whose frequency is changed.

Beam 2: Raman beams 404 co-propagate to PBS 422. R1 transmits through PBS 422 and R2 reflects off PBS 422. R1 travels in one direction to intersect interaction region 432, and R2 is routed by mirrors in another direction to intersect interaction region 432 from the opposite side compared to R1. In some embodiments, R2 is routed by prisms instead of mirrors. In some embodiments, the beam-splitter and optics for the redirecting are part of a rigid assembly. For example, mirror 426, mirror 438, and mirror 440 are bonded to a glass substrate such as Zerodur. Zerodur has nearly zero coefficient of thermal expansion which ensures that the optical path of the two beams does not drift appreciably during the interferometer measurement. QWP 428 and QWP 436 produce proper beam polarization for the interferometer beams in interaction region 432. R1 transmits through QWP 428 prior to intersecting interaction region 432 where the atomic cloud is located, and R2 transmits through QWP 436 prior to intersecting interaction region 432, so that R1 and R2 have opposite circular polarizations when intersecting interaction region 432. For example, beam 420 (that includes R1 or MOT_v1) passes through QWP 428 before entering interaction region 432, and beam 424 (that includes R2 or the second cooling beam, MOT_v2) passes through QWP 436 before entering interaction region 432.

For the atom cooling stage, R2 is turned off and R1 is re-used as one of the vertical cooling beams. MOT_v2 enters through the second port of PBS 422. This results in the two beams after PBS 422 having the same polarization and ensures that the beams are properly polarized for the atom cooling stage. During cooling, the frequency of R1 is made the same as the frequency of MOT_v2.

Three MOT beams are split off from incoming Beam 1: MOT beams 402. The first cooling beam 414 (MOT_v1), the second cooling beam 418 MOT_v2, and the transverse cooling beam 430 (MOT_t)) enter interaction region 432. MOT_v2 comes in from the side of PBS 422 and follows the same path as R2 but with the opposite polarization. MOT_v1, which is combined with the R1 and R2 in NPBS 406, comprises a vertical MOT beam that has the same polarization and path as R1. This results in MOT_v1 and MOT_v2 counter-propagating in interaction region 432 and provides the MOT cooling/trapping in the vertical direction (i.e., the same as the direction of propagation of the Raman beams at the atoms). In some embodiments, R1 is re-used as MOT beam MOT_v1 after changing frequency to match MOT_v2 beam where R2 is turned off.

In some embodiments, beam 418, or MOT_v2, is linearly polarized and is transmitted through a polarizing beam splitter orthogonal to MOT_v1, which is part of beam 416 that is also transmitted through PBS 422. In some embodiments, MOT_v1, which is part of beam 416, on the common path transmits through QWP 428 prior to intersecting interaction region 432 and MOT_v2, which is part of beam 424, on the opposing path transmits through a second quarter wave plate 436 prior to intersecting interaction region 432, where MOT_v1 and MOT_v2 have identical circular polarizations when intersecting interaction region 432.

MOT_t, which comprises beam 430, arrives in the same plane as MOT_v1 and MOT_v2 but is race-tracked around and retro-reflected to provide MOT confinement in the other two dimensions (horizontal and into/out of the page (not shown in FIG. 4)). MOT_t passes through QWP 442 before entering interaction region 432. In some embodiments, Beam 2: Raman beams 404 is generated by two separate lasers that generate two separate beams R1 and R2 and is multiplexed by switching between the two beams R1 and R2, where the two beams R1 and R2 follow the common path of beam 416.

Detection fluorescence signal 434 contains information about the atomic states of the atoms in interaction region 432 and is sent to a photodiode (PD) for measurement. In some embodiments, interaction region 432 is enclosed in a magnetic shield made of mu metal. In some embodiments, interaction region 432 is within a vacuum chamber.

Figure 5:
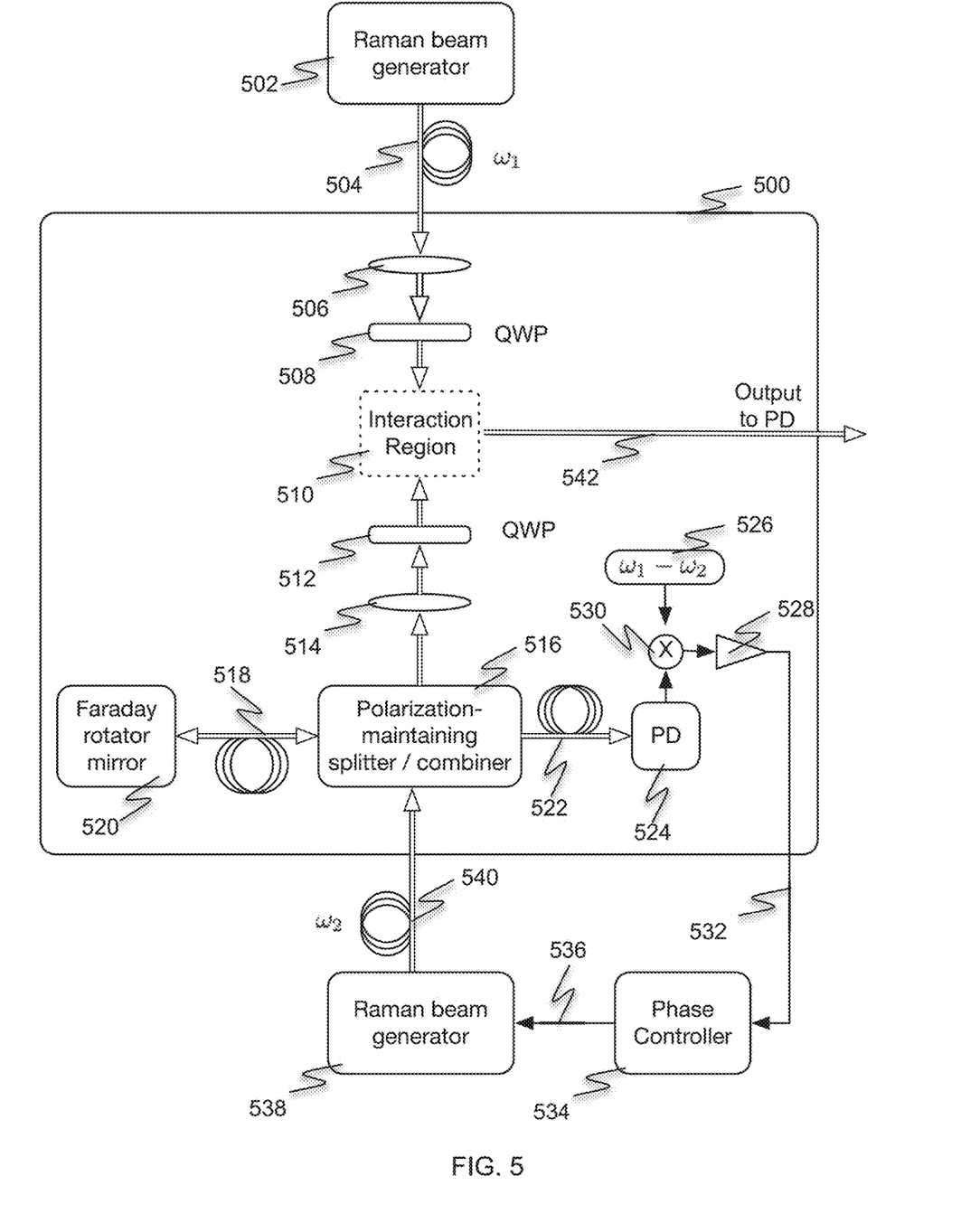
FIG. 5 is a block diagram illustrating an embodiment of an atomic interferometer.

FIG. 5 is a block diagram illustrating an embodiment of an atomic interferometer. In some embodiments, atomic interferometer 500 of FIG. 5 is used to implement atomic interferometer 120 of FIG. 1. In the example shown, the atomic interferometer comprises interaction region 510, polarization maintaining splitter/combiner 516, quarter wave plate (QWP) 508, QWP 512, collimating lens 506, collimating lens 514, fiber optic 518, fiber optic 522, Faraday rotator mirror 520, and photodiode 524.

Two phase-modulated interferometer beams are generated by Raman beam generator 502 and Raman beam generator 538 and delivered to atomic interferometer 500 via optical fiber 504 and optical fiber 540, both of which have non-common mode optical paths. In some embodiments, Raman beam generator 502 and Raman beam generator 538 are implemented by frequency-stabilized laser 100, wave guide modulator (WGM) 104, acousto-optic deflector (AOD) 108 of FIG. 1.

In some embodiments, a first pair of laser frequencies interact with the atoms in an interaction region and the second pair of laser frequencies interact with the atoms in an interaction region, where the first pair of laser frequencies and the second pair of laser frequencies are actively phase-stabilized stabilized relative to one another. For example, active stabilization is performed by combining the first pair of laser frequencies from Raman beam 504 and the second pair of laser frequencies from Raman beam 540 on a fast photodetector to compensate for any optical path drift during the interferometer measurement. In some embodiments, the active phase stabilization is performed using an optical beat note between the pairs of laser frequencies. For example, because the two Raman beams are phase-modulated, they form a heterodyne beat at a point of interference of the two beams. Any phase drift of one beam with respect to the other beam will change the intensity of the measured beat-note. By actively changing the phase of one of the two beams, the intensity of the interfered signal is maintained thereby compensating for any relative optical path drift of the two beams. In some embodiments, beam combining is performed by polarization maintaining splitter/combiner 516 and Faraday rotator mirror 520. Faraday rotator mirror 520 changes the state of polarization of the input light by reflecting light that is rotated 90° from that of the input light. In some embodiments, photodetector is photodetector 524. In some embodiments, phase controller 534 is implemented by controller 122 of FIG. 1.

In some embodiments, detection florescence signal 542 is analogous to detection florescence signal 434, which contains information about the atomic states of the atoms in interaction region 510 and is sent to a photodiode (PD) for measurement.

In some embodiments, photodiode signal 524 detects the heterodyne beat note between Raman beams at $\omega_1$ and $\omega_2$ at the difference frequency $\omega_1-\omega_2$, mixer 530 takes an RF reference signal 526 at frequency $\omega_1-\omega_2$ and mixes it with the output of photodiode 524 to extract a DC signal proportional to the phase relative phase of $\omega_1$ and $\omega_2$. This DC signal is then amplified by amplifier 528 to produce error signal 532 that used by phase controller 534 to control the phase of one of the Raman beams. In some embodiments, the phase is controlled in generating $\omega_2$ by Raman beam generator 538 in order to maintain a fixed relative phase between the two Raman beams. In some embodiments, the fixed relative phase relation between the two Raman beams is achieved by controlling the phase of one of the RF frequencies that is modulated onto the optical beam to create $\omega_2$. In some embodiments, the signal from mixer 530 is fed directly to phase controller 534, where any appropriate conditioning—for example, filtering and/or amplification—is performed.

In some embodiments, the role of Faraday rotator mirror 520 is to rotate the polarization of the beam by 90 degrees so that the two Raman beams, which have opposite linear polarization at the atoms, have the same linear polarization on photodiode 524, which allows them to interfere and create the heterodyne beat note.

In some embodiments, polarization maintaining splitter/combiner 516 couples a small fraction of the light between the up-down path and the left-right path in FIG. 5 (so that a small fraction (e.g., 1%, 5%, 10%, etc.) of the upward $\omega_2$ light goes to Faraday rotator mirror 520, which then is reflected back with the orthogonal linear polarization and the majority of it (e.g., 99%, 95%, 90%, etc.) then goes to photodiode 524, while, for the downward beam $\omega_1$, a small fraction (e.g., 1%, 5%, 10%, etc.) of it also goes to photodiode 524). The upward and downward beams have orthogonal linear polarizations at the atoms, so the two pickoff beams at photodiode 524 have the same polarization (since one of them had its polarization rotated).

Figure 6:
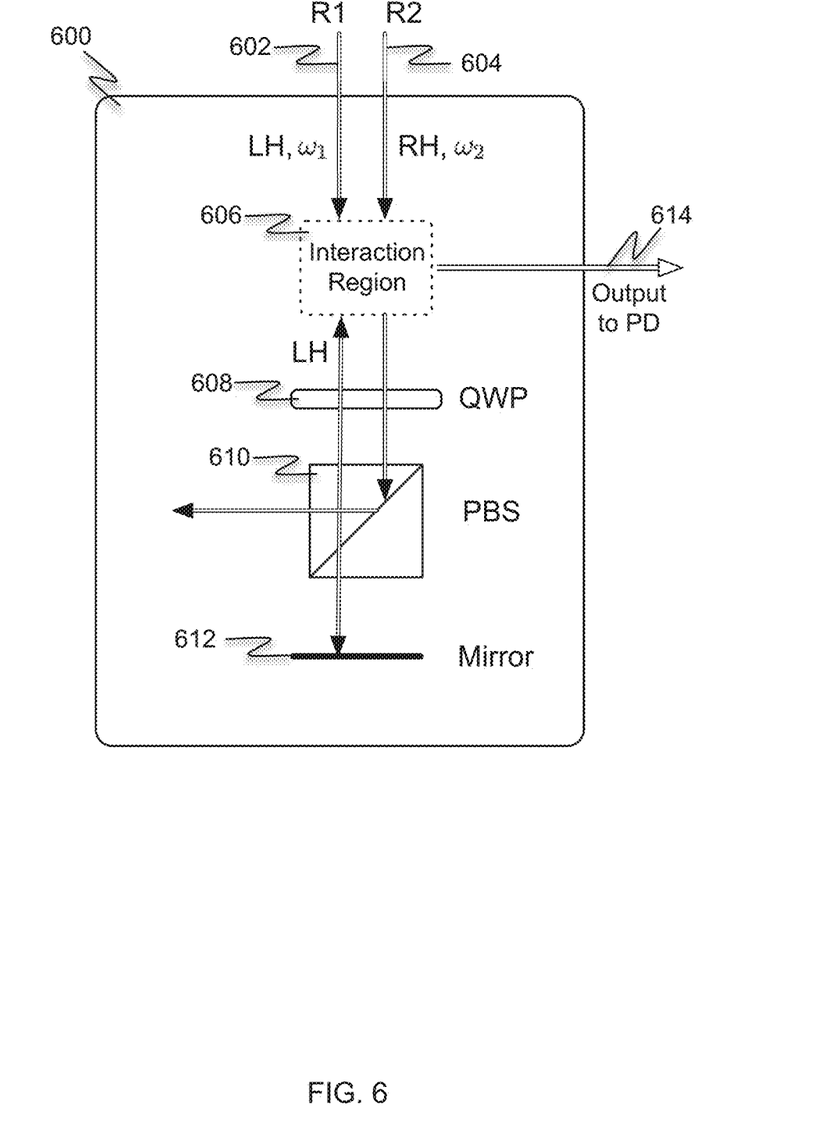
FIG. 6 is a block diagram of an embodiment of an atomic interferometer utilizing polarization selection for high-bandwidth gravimetry or accelerometry.

FIG. 6 is a block diagram of an embodiment of an atomic interferometer utilizing polarization selection for high-bandwidth gravimetry or accelerometry. In some embodiments, atomic interferometer 600 of FIG. 6 is used to implement atomic interferometer 120 of FIG. 1. In the example shown, the atomic interferometer comprises interaction region 606, quarter wave plate (QWP) 608, polarizing beam splitter 610, and mirror 612.

In some embodiments, a first pair of laser frequencies and a second pair of laser frequencies co-propagate through an interaction region with opposite circular polarizations and then pass through a quarter wave plate and a polarizing beam-splitter that transmits the second pair of laser frequencies to be reflected back to the interaction region and reflects the first pair of laser frequencies to be dumped away from the interaction region. For example, a first pair of laser frequencies in beam 602 (R1) and a second pair of laser frequencies in beam 604 (R2) enter atomic interferometer 600 with opposite circular polarizations (LH and RH) before interacting with the atoms in interaction region 606. Beam 604 (RH polarization) is blocked from retro-reflecting on mirror 612 using quarter-wave-plate (QWP) 608 and polarizing beam splitter 610. When Beam 602 (R1) and beam 604 (R2) have different carrier frequencies ($\omega_1$ vs. $\omega_2$, respectively) the pair of beams that will drive a Doppler-sensitive Raman transition is R1 after retro-reflection (up direction in FIG. 6) and R2 before retro-reflection (down-direction in FIG. 6). This geometry minimizes the non-common mode path without needing active stabilization or a physical racetrack.

Figure 7:
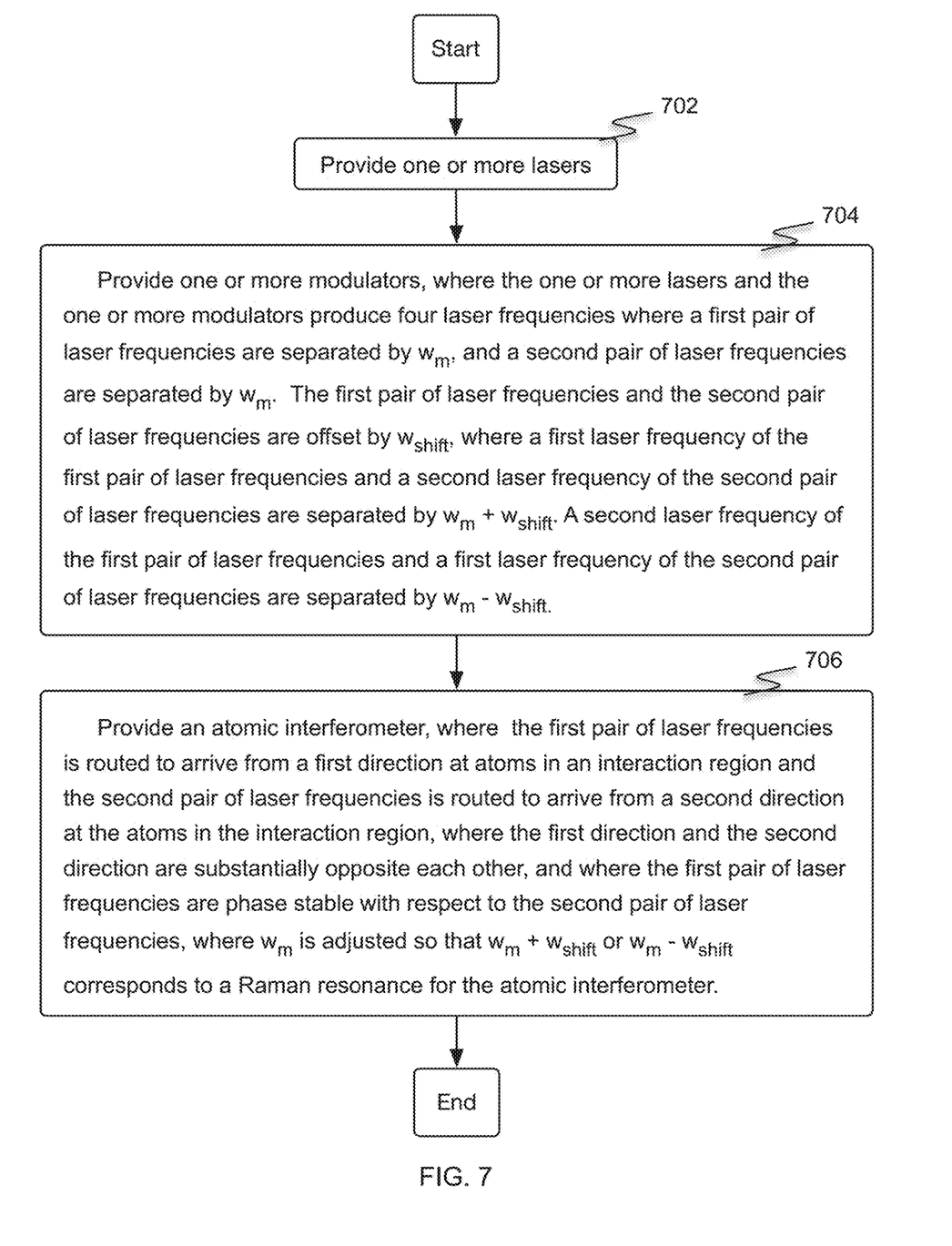
FIG. 7 is a flow diagram illustrating an embodiment for a method for a high bandwidth gravimeter or accelerometer.

FIG. 7 is a flow diagram illustrating an embodiment for a method for a high bandwidth gravimeter or accelerometer. In some embodiments, the process of FIG. 7 is used to create the system of FIG. 1. In the example shown, in 702 one or more lasers is provided, and control passes to 704. In 704, one or more modulators is provided, where the one or more lasers and the one or more modulators produce four laser frequencies, where a first pair of laser frequencies are separated by $w_m$, and a second pair of laser frequencies are separated by $w_m$. The first pair of laser frequencies and the second pair of laser frequencies are offset by $w_{shift}$, where a first laser frequency of the first pair of laser frequencies and a second laser frequency of the second pair of laser frequencies are separated by $w_m+w_{shift}$. A second laser frequency of the first pair of laser frequencies and a first laser frequency of the second pair of laser frequencies are separated by $w_m-w_{shift}$, and control passes to 706. In 706, an atomic interferometer is provided, where the first pair of laser frequencies is routed to arrive from a first direction at atoms in an interaction region, and the second pair of laser frequencies is routed to arrive from a second direction at the atoms in the interaction region, where the first direction and the second direction are substantially opposite each other, and where the first pair of laser frequencies are phase stable with respect to the second pair of laser frequencies, where $w_m$ is adjusted so that $w_m+w_{shift}$ or $w_m-w_{shift}$ corresponds to a Raman resonance for the atomic interferometer, and the process ends.

Figure 8:
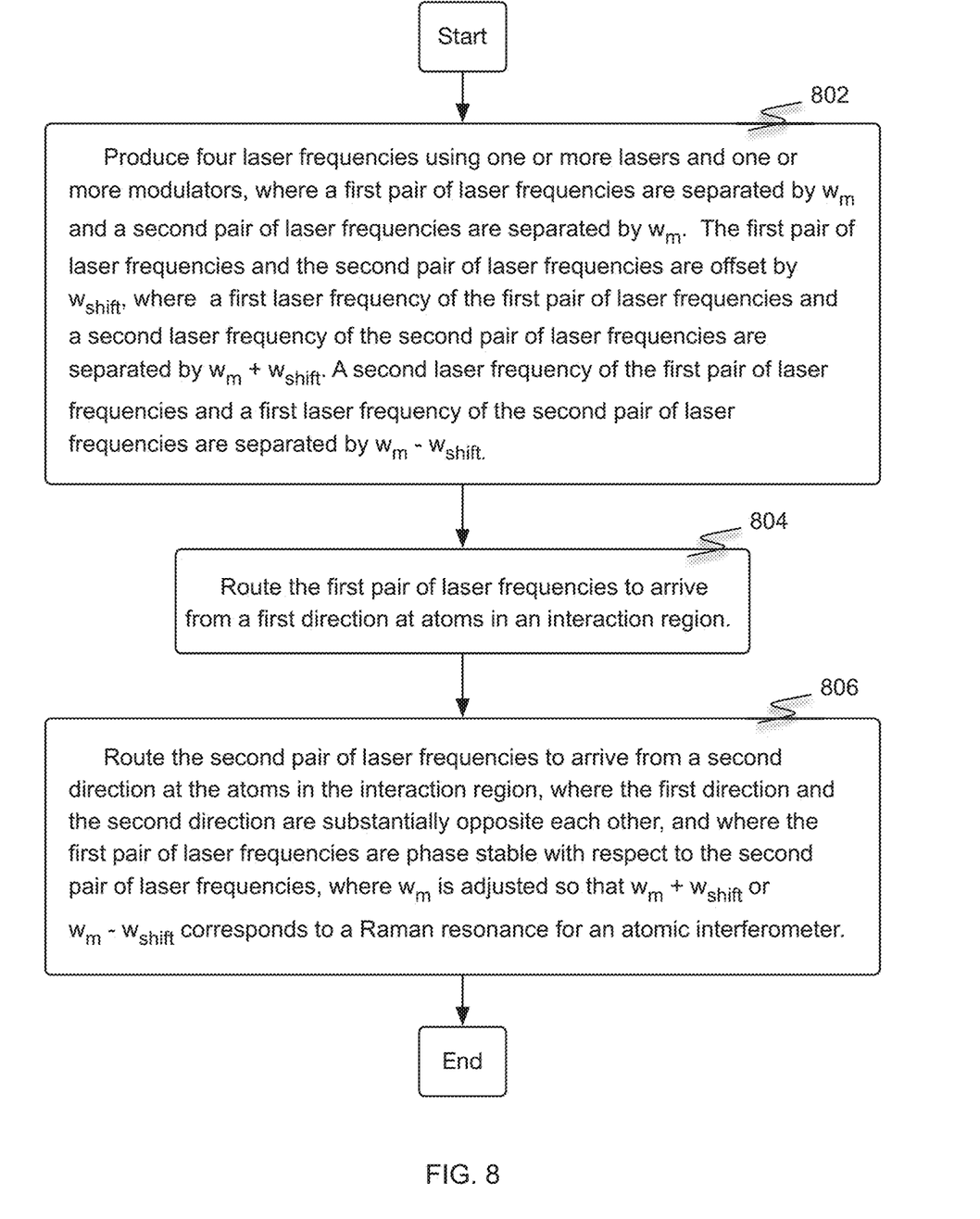
FIG. 8 is a flow diagram illustrating an embodiment for a method for a high bandwidth gravimeter or accelerometer.

FIG. 8 is a flow diagram illustrating an embodiment for a method for a high bandwidth gravimeter or accelerometer. In some embodiments, the process of FIG. 8 is used to create the system of FIG. 1. In the example shown, in 802 four laser frequencies using one or more lasers and one or more modulators are produced, where a first pair of laser frequencies are separated by $w_m$. and a second pair of laser frequencies are separated by $w_m$. The first pair of laser frequencies and the second pair of laser frequencies are offset by $w_{shift}$, where a first laser frequency of the first pair of laser frequencies and a second laser frequency of the second pair of laser frequencies are separated by $w_m+w_{shift}$. A second laser frequency of the first pair of laser frequencies and a first laser frequency of the second pair of laser frequencies are separated by $w_m-w_{shift}$, and control passes to 804. In 804, the first pair of laser frequencies is routed to arrive from a first direction at atoms in an interaction region, and control passes to 806. In 806, the second pair of laser frequencies is routed to arrive from a second direction at the atoms in the interaction region, where the first direction and the second direction are substantially opposite each other, and where the first pair of laser frequencies are phase stable with respect to the second pair of laser frequencies, where $w_m$ is adjusted so that $w_m+w_{shift}$ or $w_m-w_{shift}$ corresponds to a Raman resonance for an atomic interferometer, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
   One or more lasers;

One or more modulators, wherein the one or more lasers and the one or more modulators produce four laser frequencies, wherein a first pair of laser frequencies are separated by $w_m$, wherein a second pair of laser frequencies are separated by $w_m$, and wherein the first pair of laser frequencies and the second pair of laser frequencies are offset by $w_{shift}$, wherein a first laser frequency of the first pair of laser frequencies and a second laser frequency of the second pair of laser frequencies are separated by $w_m+w_{shift}$, wherein a second laser frequency of the first pair of laser frequencies and a first laser frequency of the second pair of laser frequencies are separated by $w_m-w_{shift}$; and an atomic interferometer, wherein the first pair of laser frequencies is routed to arrive from a first direction at atoms in an interaction region and the second pair of laser frequencies is routed to arrive from a second direction at the atoms in the interaction region, wherein the first direction and the second direction are substantially opposite each other, and wherein the first pair of laser frequencies are phase stable with respect to the second pair of laser frequencies, wherein $w_m$ is adjusted so that $w_m+w_{shift}$ or $w_m-w_{shift}$ corresponds to a Raman resonance for the atomic interferometer.

2. The system as in claim 1, wherein the one or more lasers comprises one laser and the one or more modulators comprises a waveguide modulator and an acousto-optic modulator.

3. The system as in claim 1, wherein the first pair of frequencies is not routed to arrive from the second direction while the second pair of frequencies is routed to arrive from the first direction.

4. The system as in claim 1, wherein the first pair of laser frequencies and the second pair of laser frequencies initially follow substantially a same path with opposite linear polarizations, wherein the first pair of laser frequencies is transmitted through a polarizing beam splitter before interacting with the atoms from the first direction and the second pair of laser frequencies is deflected by the polarizing beam splitter and redirected to interact with the atoms from the second direction.

5. The system as in claim 4, where the redirecting uses one or more mirrors.

6. The system as in claim 4, where the redirecting uses one or more prisms.

7. The system as in claim 4, where the first pair of laser frequencies goes through a first quarter waveplate before interacting with the atoms.

8. The system as in claim 4, where the second pair of laser frequencies goes through a second quarter waveplate before interacting with the atoms.

9. The system as in claim 4, where the beamsplitter and optics for the redirecting are part of a rigid assembly.

10. The system as in claim 1, wherein the first pair of laser frequencies interact with the atoms in the interaction region and the second pair of laser frequencies interact with the atoms in the interaction region, wherein the first pair of laser frequencies and the second pair of laser frequencies are actively phase-stabilized stabilized relative to one another.

11. The system as in claim 10, wherein the active phase stabilization is performed using an optical beat note between the pairs of laser frequencies.

12. The system as in claim 1, wherein the first pair of laser frequencies and the second pair of laser frequencies co-propagate through the interaction region with opposite circular polarizations and then pass through a quarter wave plate and a polarizing beam splitter that transmits the second pair of laser frequencies to be reflected back to the interaction region and reflects the first pair of laser frequencies to be dumped away from the interaction region.

13. A method, comprising:
providing one or more lasers;
providing one or more modulators, wherein the one or more lasers and the one or more modulators produce four laser frequencies, wherein a first pair of laser frequencies are separated by $w_m$, wherein a second pair of laser frequencies are separated by $w_m$, and wherein the first pair of laser frequencies and the second pair of laser frequencies are offset by $w_{shift}$, wherein a first laser frequency of the first pair of laser frequencies and a second laser frequency of the second pair of laser frequencies are separated by $w_m+w_{shift}$, wherein a second laser frequency of the first pair of laser frequencies and a first laser frequency of the second pair of laser frequencies are separated by $w_m-w_{shift}$; and providing an atomic interferometer, wherein the first pair of laser frequencies is routed to arrive from a first direction at atoms in an interaction region and the second pair of laser frequencies is routed to arrive from a second direction at the atoms in the interaction region, wherein the first direction and the second direction are substantially opposite each other, and wherein the first pair of laser frequencies are phase stable with respect to the second pair of laser frequencies, wherein $w_m$ is adjusted so that $w_m+w_{shift}$ or $w_m-w_{shift}$ corresponds to a Raman resonance for the atomic interferometer.

14. A method, comprising:
producing four laser frequencies using one or more lasers and one or more modulators, wherein a first pair of laser frequencies are separated by $w_m$, wherein a second pair of laser frequencies are separated by $w_m$, and wherein the first pair of laser frequencies and the second pair of laser frequencies are offset by $w_{shift}$, wherein a first laser frequency of the first pair of laser frequencies and a second laser frequency of the second pair of laser frequencies are separated by $w_m+w_{shift}$, wherein a second laser frequency of the first pair of laser frequencies and a first laser frequency of the second pair of laser frequencies are separated by $w_m-w_{shift}$;

routing the first pair of laser frequencies to arrive from a first direction at atoms in an interaction region; and routing the second pair of laser frequencies to arrive from a second direction at the atoms in the interaction region, wherein the first direction and the second direction are substantially opposite each other, and wherein the first pair of laser frequencies are phase stable with respect to the second pair of laser frequencies, wherein $w_m$ is adjusted so that $w_m+w_{shift}$ or $w_m-w_{shift}$ corresponds to a Raman resonance for an atomic interferometer.

* * * * *